(12) United States Patent
Otterberg

(10) Patent No.: US 7,134,384 B1
(45) Date of Patent: Nov. 14, 2006

(54) METHOD AND DEVICE FOR PRODUCING BEVERAGES

(75) Inventor: Tomas Otterberg, Ludvika (SE)

(73) Assignee: Hellasvagen Development AB, Grangesberg (SE)

( * ) Notice: Subject to any disclaimer, the term of this patent is extended or adjusted under 35 U.S.C. 154(b) by 458 days.

(21) Appl. No.: 10/130,980

(22) PCT Filed: Nov. 23, 2000

(86) PCT No.: PCT/SE00/02306

§ 371 (c)(1),
(2), (4) Date: Sep. 23, 2002

(87) PCT Pub. No.: WO01/37714
PCT Pub. Date: May 31, 2001

(30) Foreign Application Priority Data

Nov. 24, 1999 (SE) .................................... 9904260

(51) Int. Cl.
*A23F 5/26* (2006.01)
(52) U.S. Cl. ............................. 99/280; 99/285; 99/287; 99/289 R; 99/300; 99/323.3
(58) Field of Classification Search .................. 99/275, 99/279, 280, 285, 287, 288, 289 R, 300, 99/323.3; 221/52, 160, 205, 249–250
See application file for complete search history.

(56) References Cited

U.S. PATENT DOCUMENTS

| | | | | |
|---|---|---|---|---|
| 2,935,011 A | * | 5/1960 | Perlman | 99/283 |
| 3,759,162 A | * | 9/1973 | Maxwell | 99/289 R |
| 3,974,758 A | * | 8/1976 | Stone, Jr. | 99/275 |
| 4,116,246 A | | 9/1978 | Franzen | |
| 4,271,752 A | * | 6/1981 | Valente et al. | 99/289 R |
| 4,300,442 A | * | 11/1981 | Martin | 99/289 R |
| 4,602,558 A | * | 7/1986 | Kaper et al. | 99/289 R |
| 4,625,776 A | * | 12/1986 | Mikkelsen | 141/83 |
| 4,694,740 A | | 9/1987 | Daloz | |
| 5,367,948 A | * | 11/1994 | Di Fusco et al. | 99/289 R |
| 5,492,054 A | * | 2/1996 | Schneeberger | 99/289 R |
| 5,722,313 A | * | 3/1998 | Schmed | 99/289 R |
| 5,823,096 A | * | 10/1998 | Shih | 99/302 P |
| 5,896,805 A | * | 4/1999 | Katou et al. | 99/289 R |
| 6,360,650 B1 | * | 3/2002 | Mangiapane | 99/291 |

* cited by examiner

*Primary Examiner*—Drew Becker
(74) *Attorney, Agent, or Firm*—Young & Thompson

(57) ABSTRACT

A method for preparing beverages, includes supplying water from a water source to a tapping point, supplying powder for beverages from a container to the tapping point, characterized in that the supplying of powder for beverages is performed without the influence of gravitational force. The invention also relates to a device for carrying out the method.

7 Claims, 5 Drawing Sheets

METHOD AND DEVICE FOR PRODUCING BEVERAGES

TECHNICAL AREA

The present invention relates to a method for preparing beverages, comprising supplying water from a water source to a tapping point, supplying powder for beverages from a container to the tapping point. The invention also relates to a device for carrying out the invention.

BACKGROUND OF THE INVENTION

Today's society with increased mobility of goods and people has led to the transport sector becoming a large and important factor. The transport sector comprises long-distance trucks shipping cargo both internationally and nationally, lorries for medium distance and regional transports, long-distance busses as well as trains and ships, to mention some.

Within this sector, as with so many other, the demands for fast and flexible transports, together with many competitors in the sector pressing the prizes, has led to a high pressure on keeping the vehicles moving as much as possible.

This in turn means that the drivers are forced to minimum lunch and coffee breaks as stated by the law. In order to have a cup of coffee or the like whenever they want to, many transporting vehicles are equipped with coffee makers placed in the driver cabin.

The coffee makers for vehicles on the market today have a design very similar to a household coffee maker with a water container, a heating plate on which a glass jug is placed and a filter holder on top of the jug. Usually the only difference is that they are adapted to a much lower voltage so that they can be connected to the vehicle's electrical system.

Since these coffee makers are not adapted to a moving vehicle, they are quite a safety risk. In order to operate the maker the driver has to take his eyes off the road for quite some time, even to fill a cup. Further since the coffee jug is only supported on the heating plate by a low ledge, there is a great risk that the jug falls off should the vehicle make a sudden turn or break, whereby coffee will be spilled all over the cabin and on the driver. Further, hot steam from the coffee maker could condense on the windshield if the coffee maker is placed on the dashboard. There is thus a need for a coffee maker adapted to moving vehicles and which does not constitute a safety risk for the driver or the traffic.

Other types of makers of beverages use freeze-dried powder for beverages, such as instant coffee, cocoa, or beverages based on fruit or berries. The powder is placed in a container arranged above the tapping point of the maker. A water supply is also arranged to the tapping point. When the beverage is to be prepared the bottom of the container is opened to allow a certain amount of powder to fall down, either into an intermediate mixing chamber or a mug or the like. An amount of water is also supplied whereby they mix and produce a beverage.

For vehicles and the like with limited space available this type of maker is not optimal because it tends to be rather high and generally bulky, even though the use of freeze-dried powder is an advantage since it is easy to handle and produces beverages very fast.

BRIEF DESCRIPTION OF THE INVENTION

The aim of the invention is provide a method and device for preparing beverages that is not affected by movement or position, that can be used in various conditions and is easy, safe, reliable to use and compact.

This aim is achieved according to one aspect of the invention with a method according to the preamble of the description characterised in that the supplying of powder for beverages is performed without the influence of gravitational force.

This aim is achieved according to another aspect of the invention with a device characterised in that the means for supplying powder for beverages is designed and arranged such that it supplies the powder for beverages without the influence of gravitational force.

According to vet an aspect of the invention it is characterised in that the means for supplying powder for beverages is arranged with a compartment communicating with the container and the tapping point, feeding means arranged to feed the powder in the compartment, and blocking means able of sealing off the communication between the compartment and the tapping point.

According to a further aspect of the invention it is characterised in means for changing the size of the container, whereby the size is reduced each time powder for beverages is supplied.

The present invention is preferably further provided with means for detecting that the compartment is filled with powder when the feeding means is feeding powder, and that said feeding means is shut off when the compartment is completely filled.

The advantages with the present invention are several. Because the powder for beverages is supplied by other means than gravitation, the container containing powder for beverages may be placed in any position defined by the space requirements.

Further since the supplying means is arranged with a compartment communicating with the container and the tapping point and for the rest is closed off to the surroundings, and that the communication between the compartment and the tapping point can be sealed off, there is no risk that the powder may be affected by moisture generally present in vehicles and hot steam from the prepared beverage.

The container is preferably arranged with means for changing the size of the container. This may for example be done by moving a wall of the container, preferably the wall opposite the communication opening with the compartment. The powder will thereby be pushed into the compartment and the space of the container will always be filled with powder.

Preferably the same amount of powder will be delivered into the compartment each time the means is activated corresponding to a specific dose of powder, for example one cup of prepared beverage. It is then easy for the device to monitor the number of doses delivered, and if the device obtains information regarding the total number of doses the container may contain, the device may alert the user when the container is about to be empty.

These and other aspects of, and advantages with, the present invention will become apparent from the detailed description of a preferred embodiment and from the accompanying drawings.

DESCRIPTION OF THE DRAWINGS

In the detailed description reference will be made to the accompanying drawings, of which

DETAILED DESCRIPTION OF PREFERRED EMBODIMENT

Figure 1:
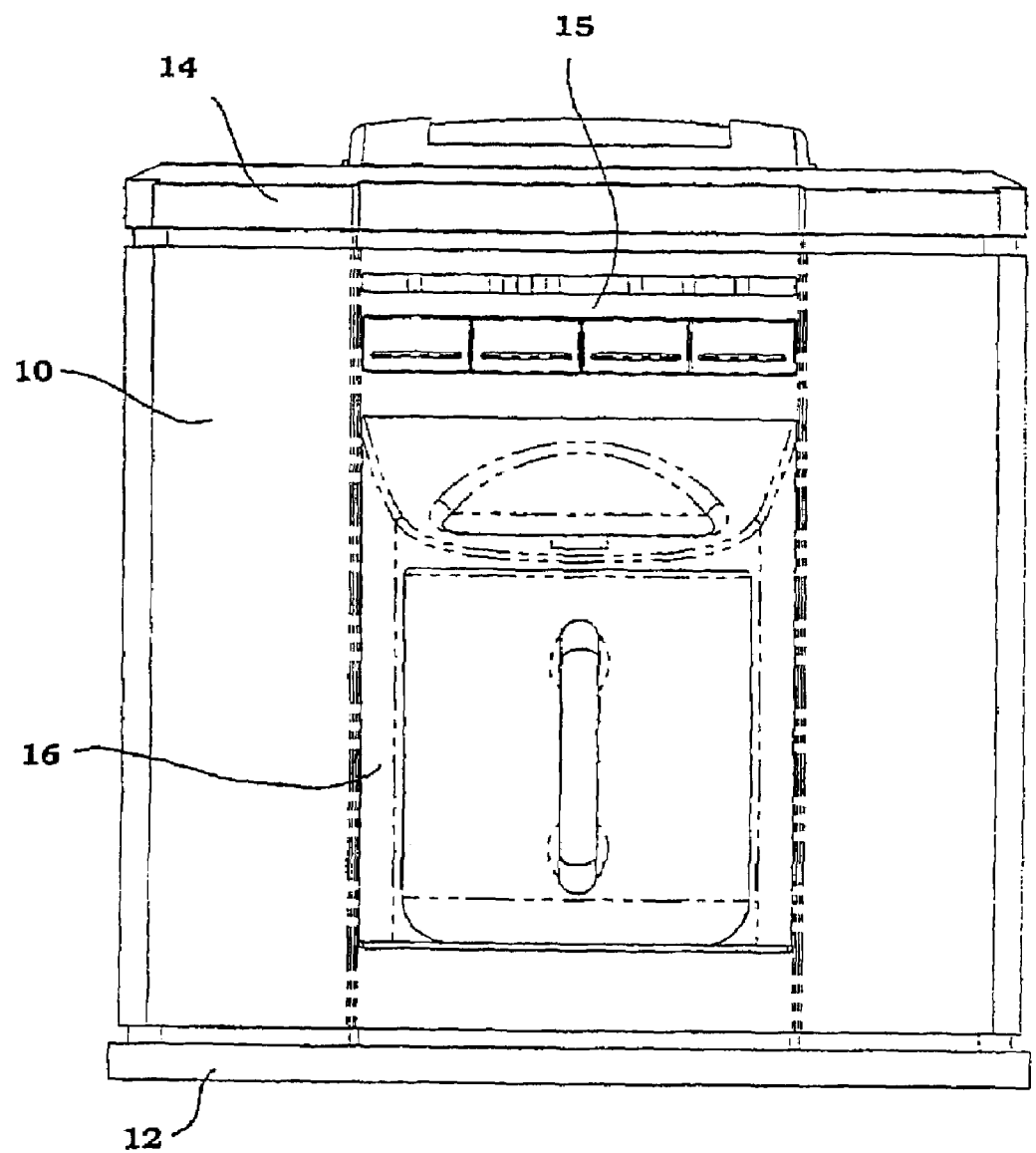
FIG. 1 shows a front view of an embodiment of a device some features removed for clarity.
Figure 2:
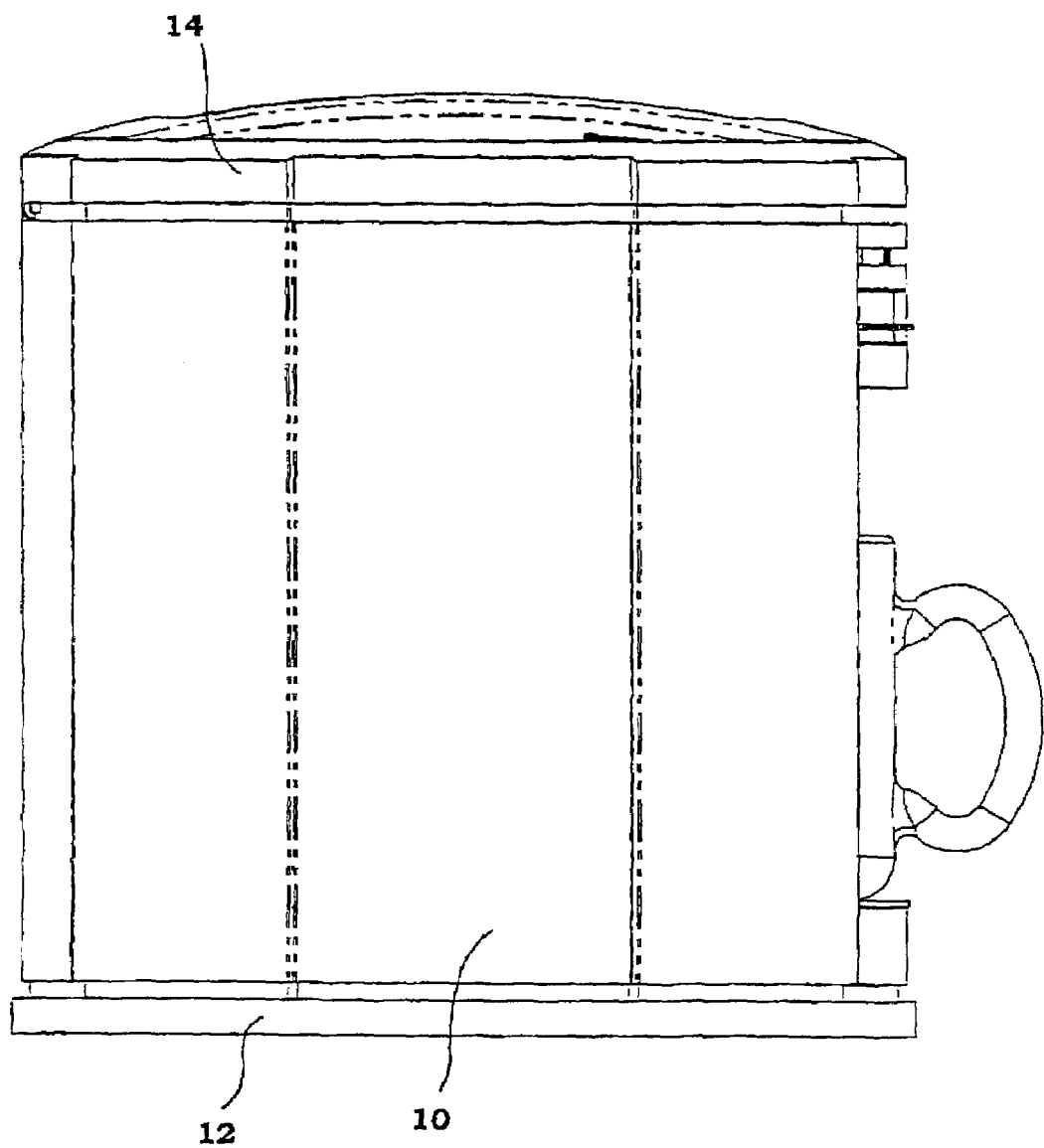
FIG. 2 shows a side view of the embodiment of FIG. 1.
Figure 3:
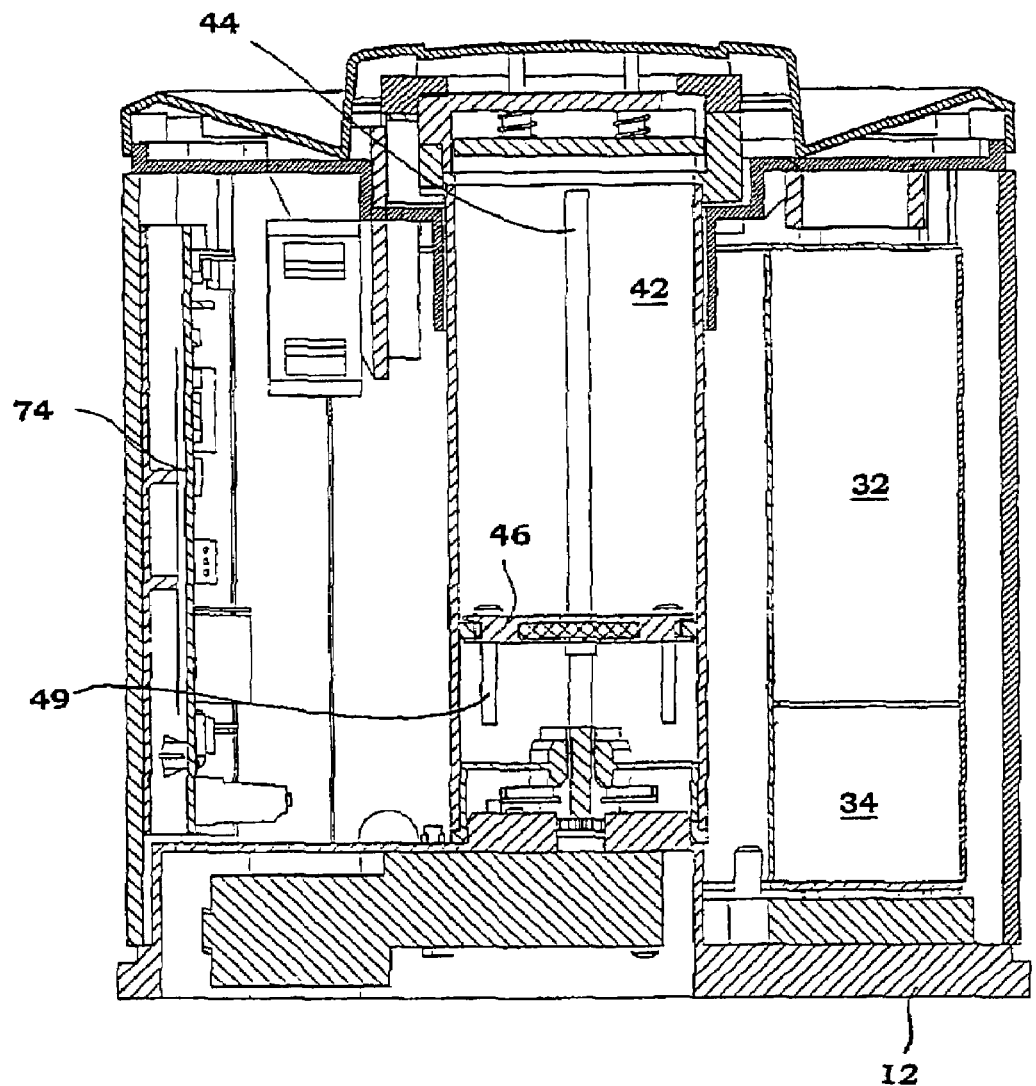
FIG. 3 shows a cross-section taken along line II—II of FIG. 1.
Figure 4:
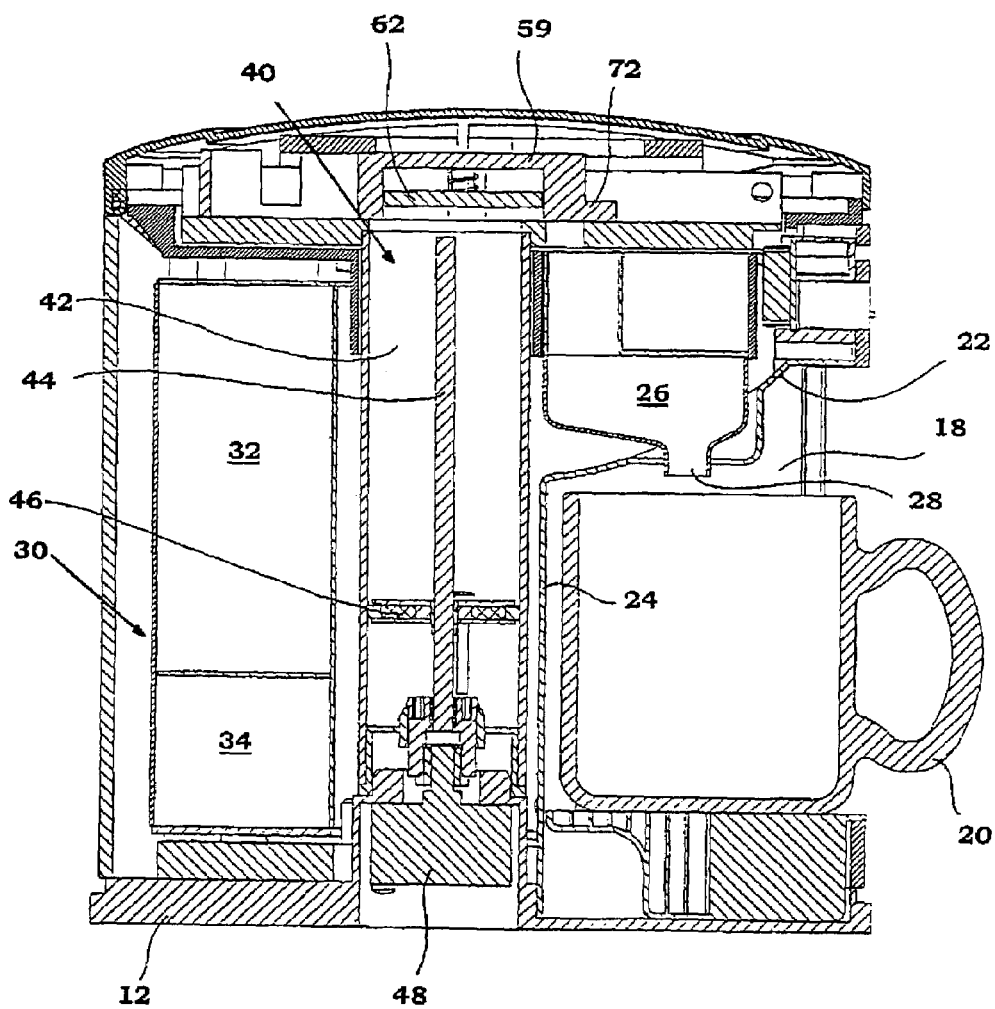
FIG. 4 shows a cross-section taken along line III—III of FIG. 1, and FIGS. 5–8 show detailed views of a feeding means comprised in the present invention.
Figure 8:
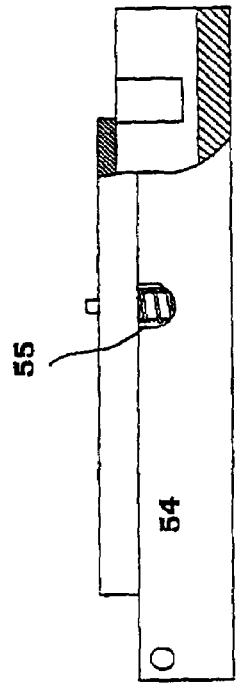
Figure 6:
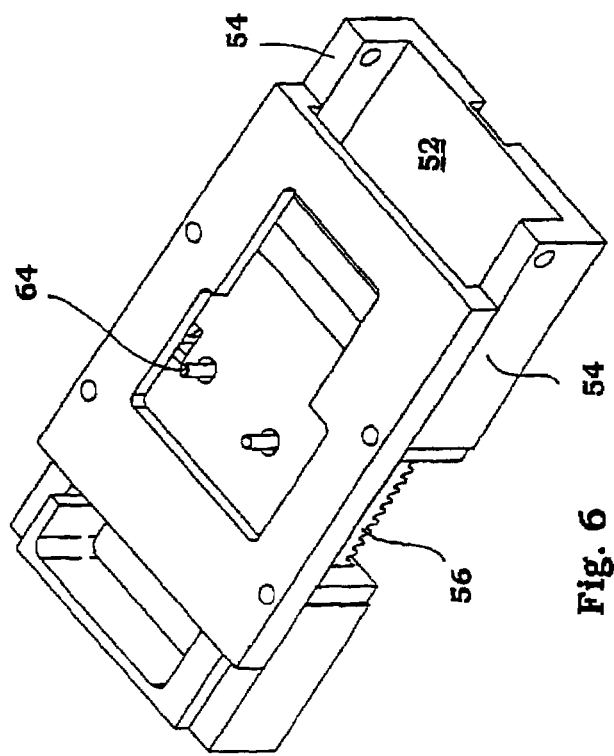
Figure 7:
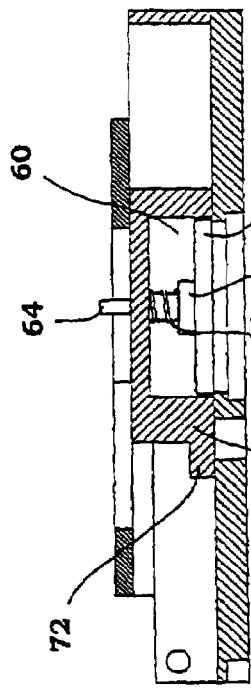

The device shown in FIGS. 1–4 comprises a housing 10, with a substantially cylindrical shape in the embodiment shown. The housing is arranged with a bottom plate 12, which may be arranged with fastening means (not shown) for attachment to the interior of a vehicle and a top lid 14 removably arranged. A control panel 15 is arranged on the housing, comprising buttons for choice of beverage, beverage strength and the like, and indication lamps for indicating the state of the device, such as warning for low powder or water level, that the device is operating and the like.

The housing is further arranged with an opening 16 on the side, which opening opens up to a space 18 arranged for a mug or a cup 20 to be placed in. The space has an upper wall 22, FIG. 4, with a somewhat curved shape from the back wall 24 of the space to the upper edge of the opening. A mixing chamber 26 is arranged above the space with an outlet extending through the upper wall forming a tapping point 28.

A supply means for water 30 is connected to the tapping point. The water supply means comprises a water tank 32 arranged inside the housing, containing an amount of water. The water tank is connected to an intermediate tank 34. The intermediate tank is adapted to contain a smaller, specific amount of water, e.g. for two mugs and is provided with heating means, not shown, for heating the water in the intermediate tank. The intermediate tank is connected to a pump (not shown), which in turn is connected to the tapping point 28 via a conduit.

The device further comprises means for supplying powder for beverages 40, comprising a container 42 intended to contain powder for beverages, e.g. freeze-dried coffee powder. The container is arranged with an elongated vertical shape and rectangular cross-section. A threaded vertical shaft 44 is arranged in the container space. The bottom 46 of the container is arranged with a threaded through-hole, in which the shaft is arranged. The lower part of the shaft is supported by bearings and attached to an electrical motor 48, preferably a stepper motor, via a transmission. The bottom of the container is further provided with contact pins 49; which pins, when the bottom is at its lowermost position come in contact with breakers (not shown) for switching off the electrical motor. A measuring device (not shown) is arranged adjacent said transmission for measuring the position of the bottom in the container. The measuring device could comprise a light transmitter and receiver placed on opposite sides of wings connected to the shaft, where the wings have a certain space between each other. When the shaft rotates, the transmitter will receive a light pulse every time a space is moved between the transmitter and the receiver, and by counting the pulses and knowing the number of pulses per revolution, and by knowing the thread pitch of the shaft, the exact position of the bottom may be obtained.

The supply means further comprises a pusher device 50 arranged above the container. The pusher device comprises a slider tray 51, FIGS. 5–8, comprising an opening 53 with a form, which fits onto the top end of the container 42. The slider tray further comprises a horizontal sliding surface 52 with an opening into the tubular part, and two guiding side walls 54. A recess 55 is arranged in one of the side-walls at the centre line of the opening as seen in a vertical direction. A longitudinal slot 57 is arranged along one of the side-walls. A pusher unit 59 is slidably arranged in the slider tray. The pusher unit comprises a toothed rack 56 attached to the lower surface of the plate and protruding through the longitudinal slot. The rack is engaged with a cog-wheel rotatably attached to the shaft of an electrical motor (not shown).

Figure 5:
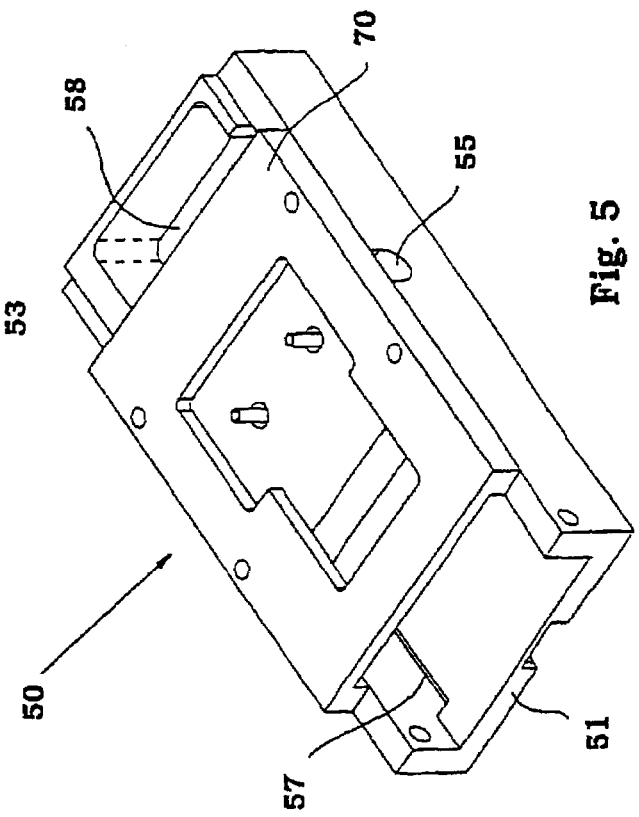

The pusher unit further comprises an opening 58 at its back end as seen in FIG. 5, which opening has substantially the same form and size as the opening in the slider tray. In front of the opening a compartment 60 is arranged, which is open downwards, where the opening of the compartment has substantially the same form and size as the opening of the slider tray. Inside the compartment is a plate 62 movably arranged to two downward directed guide pins 64. Each guide pin is arranged with a stop ledge or the like (not shown) for limiting the lowest position of the plate to when it is somewhat above the horizontal sliding surface. Each guide pin is further arranged with a compression spring 66 acting between the upper surface of the plate and the lower surface of the compartment, which springs urge the plate downwards. The compartment 60 is arranged with an opening on one sidewall. Inside the opening a protrusion 68 is arranged and attached to the upper surface of the plate. On the side surface of the protrusion facing the opening, a reflective layer is arranged. A sensor comprising a light transmitter and a light detector is arranged facing the recess and the opening. The pusher unit 59 is held in place on the tray 51 by a lid 70.

The function of the device is as follows. The container 42 is filled from above with a powder for beverages, e.g. instant coffee by removing the top lid 14. Before filling the container, the pusher unit 59 is positioned in its most advanced position whereby the opening 58 is placed above the container, and the bottom of the container is returned to its most down-ward position by rotating the threaded shaft 44. Powder may now be poured into the container 42. The lid is then brought back on, the slider motor is activated whereby its cog wheel acts on the rack and the pusher unit is withdrawn to its position where the compartment is above container. Thereafter the motor 48 rotating the shaft is activated so that the bottom 46 of the container is raised. This action pushes the powder upwards until it hits plate 62 of the compartment 60. This in turn pushes the plate upwards against the force of the compression springs 66 until the protrusion 68 with the reflective surface is visible through the opening of the compartment and the recess 55 of the guide surface. The beam of the sensor is then reflected on the reflective surface and registered by the detecting part of the sensor, whereby this triggers a shut-off of the feed motor 48. The compartment is thus filled with powder.

The moving plate of the compartment and the detection means ensures that the compartment is always filled with powder as long as there is powder in the container. The filling is thus not dependent on the actual level of powder in the container, which level may vary due to different degrees of packing of the powder as the container is shaken. The position of the bottom kept updated by the measuring device and stored in a storage media for digital information.

The water container 32 is filled with water whereby a certain amount enters the intermediate tank 34. When the device is switched on, the heating element in the intermediate tank heats the water. When a user wishes a cup of the beverage, the device is activated, whereby the pump starts pumping heated water from the intermediate tank to the mixing chamber 26. Simultaneously the electrical motor operating the pusher unit is activated whereby its cog-wheel operates the rack 56 and thereby the pusher unit 59 so that it slides towards the mixing chamber. When the plate slides forward the compartment is connected to the mixing chamber so that a metered amount of the powder contained by the compartment enters the mixing chamber and is mixed with the water. The force of the compression springs urges the plate to its lower position. In the forward position of the plate the container is protected by the pusher unit. The pusher unit is then quickly retracted by reversing the electrical motor whereby a sealing portion 72, FIG. 4, of the pusher unit seals off the connection between the mixing chamber 26 and the container 42. This because steam and moisture otherwise could enter into the compartment and cause the powder to agglomerate.

Steam and moisture is further prevented from entering the compartment due to a fan (not shown), which causes an air flow from the mixing chamber through the outlet and out through the opening 16. The mixed powder and water exits the mixing chamber through the outlet and is poured into the cup. The shape of the upper wall 22 of the space for the cup directs steam from the poured beverage out through the opening 16 and away from the device so as to prevent steam and moisture from entering the interior of the device as much as possible.

When the pusher unit 59 is in its retracted position the motor operating the bottom 46 of the container is activated so that the powder is pushed upwards and into the compartment 60 until the powder has pushed the plate 62 so that the reflective surface is visible to the sensor, which leads to a shut-off of the motor and the angular position of the shaft is measured. The angular position in relation to the previous position enables a count of the number of metered amounts of powder delivered.

The device preferably comprises electronic control means 74 including a printed circuit board, memory containing control program parts, relays timers, and micro processors for controlling and operating the device. The different motors, operation buttons, indication lamps, sensors, heating elements, pumps and the like are connected to the electronic control means for in and output of information and control signals. The control means could for example, apart from the above described functions, further automatically shut off the heater when the water level is low and automatically return the bottom of the container when all powder has been emptied. The return would also reset the stored position data for the bottom.

Even though the device has been described in connection with brewing hot coffee it is to be understood that the device may provide cold beverages as well, by e.g. pressing a certain button on the device. In this case the water supply may be arranged with additional conduits between the water container and the pump so that cold water is pumped directly to the mixing chamber. It is also to be understood that the device may provide only hot water. Again, by pressing a certain button, hot water is pumped from the intermediate tank to the mixing chamber without activating the supply means.

The device described above and shown on the drawings is designed as a separate unit. Within the scope of invention, the device may however be integrated in for example the dashboard of a vehicle. In this case the different components of the invention may be placed differently to each other in order to accommodate the device in the space available behind a dashboard.

The invention claimed is:

1. Device for preparing beverages, comprising:
   a container for powder for beverages;
   said container having a generally elongated vertical shape with an upwardly facing opening;
   a compartment arranged above and communicating with said upwardly facing opening of said container;
   a bottom plate arranged to move vertically inside said container;
   electrical and mechanical drive means structured and arranged to move said bottom plate in a vertical direction, so as to feed powder into said compartment;
   a tapping point;
   means for supplying water from a water source to the tapping point; and
   electrical and mechanical pushing means structured and arranged to move said compartment, when filled with powder, to said tapping point for mixing with said water.

2. The device according to claim 1, further comprising sealing means capable of sealing off the communication between the compartment and the tapping point.

3. The device according to claim 1, wherein said compartment is structured to contain a metered dose of powder for beverages.

4. The device according to claim 1, wherein, when the compartment is in communication with the container, the communication with the tapping point is sealed off; and when the compartment is in communication with the tapping point, the container is sealed off.

5. The device according to claim 1, further comprising detectors operatively associated to said compartment for detecting when the compartment is filled with powder.

6. The device according to claim 1, wherein the means for supplying water comprises a water tank arranged between the water source and the tapping point, and an intermediate water tank fluidly connected to the water tank; said intermediate water tank being provided with heating means for heating the water contained in the intermediate water tank.

7. The device according to claim 1, further comprising a mixing chamber for mixing the powder and water in communication with the tapping point.

* * * * *